United States Patent
Wei

(10) Patent No.: US 8,092,898 B2
(45) Date of Patent: Jan. 10, 2012

(54) WATER-REPELLENT ARRANGEMENT FOR LCD DISPLAY OF INDUSTRIAL COMPUTER

(75) Inventor: Hsiu Feng Wei, Taipei (TW)

(73) Assignee: Aplex Technology Inc., New Taipei (TW)

( * ) Notice: Subject to any disclaimer, the term of this patent is extended or adjusted under 35 U.S.C. 154(b) by 742 days.

(21) Appl. No.: 12/202,448

(22) Filed: Sep. 2, 2008

(65) Prior Publication Data
US 2010/0055406 A1    Mar. 4, 2010

(51) Int. Cl.
*H05K 5/00* (2006.01)
*H05K 7/00* (2006.01)
*G06F 1/16* (2006.01)

(52) U.S. Cl. .............. 428/167; 361/679.01; 361/679.21

(58) Field of Classification Search .................. 428/167; 174/377; 361/679.01, 679.21, 679.02; 438/30, 438/42, 43; 277/628, 637, 641, 642, 650
See application file for complete search history.

(56) References Cited

U.S. PATENT DOCUMENTS
2007/0223187 A1*  9/2007  Chou et al. .................... 361/683
* cited by examiner

*Primary Examiner* — Catherine A Simone

(57) ABSTRACT

A resilient hollow, rectangular water-repellent structure for an industrial computer, the water-repellent structure comprising in combination a peripheral groove formed between an LCD display of the industrial computer and a housing thereof, the groove having peripheral parallel mating members on either side wall; an outer member; and an inner member having a rectangular cross-section with a first shoulder formed between a front end thereof and the outer member, and a second shoulder formed between a rear end thereof and the outer member, the inner member comprising peripheral parallel corresponding mating members on each of front and rear ends thereof. The corresponding mating members are securely engaged with the mating members with the LCD display being securely engaged the front end of the inner member and the outer member and the housing being securely engaged the rear end of the inner member and the outer member.

1 Claim, 4 Drawing Sheets

WATER-REPELLENT ARRANGEMENT FOR LCD DISPLAY OF INDUSTRIAL COMPUTER

BACKGROUND OF THE INVENTION

1. Field of Invention

The invention relates to water-repellent structures and more particularly to a resilient closed member sealingly mounted between an LCD (liquid crystal display) display and an industrial computer so that water or liquid is prevented from entering the industrial computer through a gap between the LCD display and the industrial computer.

2. Description of Related Art

Conventionally, industrial computers are designed to operate in an adverse environment. Hence, industrial computers are required to be, for example, water-repellent so as to protect circuitry thereof.

A conventional type of water-repellent structure is implemented by mounting a water-repellent strip formed of rubber between each of four sides of an LCD display and an industrial computer. However, there is a gap between any two adjacent strips (i.e., at four corners). Hence, the water-repellent function is poor.

Another conventional type of water-repellent structure is implemented by mounting a water-repellent strip formed of rubber between each of four sides of an LCD display and an industrial computer in which either end of the strip is shaped as a step (i.e., mating member) adapted to engage with a step (i.e., corresponding mating member) at either end of an adjacent strip. Hence, there is substantially no gap between any two adjacent strips (i.e., at four corners). Hence, the water-repellent feature is good. However, the manufacturing cost of the strips is high. Further, the joining portion of the two adjacent steps may be deformed as time evolves. As a result, a gap still exists at each corner. Hence, the water-repellent function is still not well. Thus, a need for improvement exists.

SUMMARY OF THE INVENTION

It is therefore one object of the invention to provide a resilient closed member sealingly mounted between an LCD display and an industrial computer so that water or liquid is prevented from entering the industrial computer through a gap between the LCD display and the industrial computer.

The above and other objects, features and advantages of the invention will become apparent from the following detailed description taken with the accompanying drawings.

DETAILED DESCRIPTION OF THE INVENTION

Figure 1:
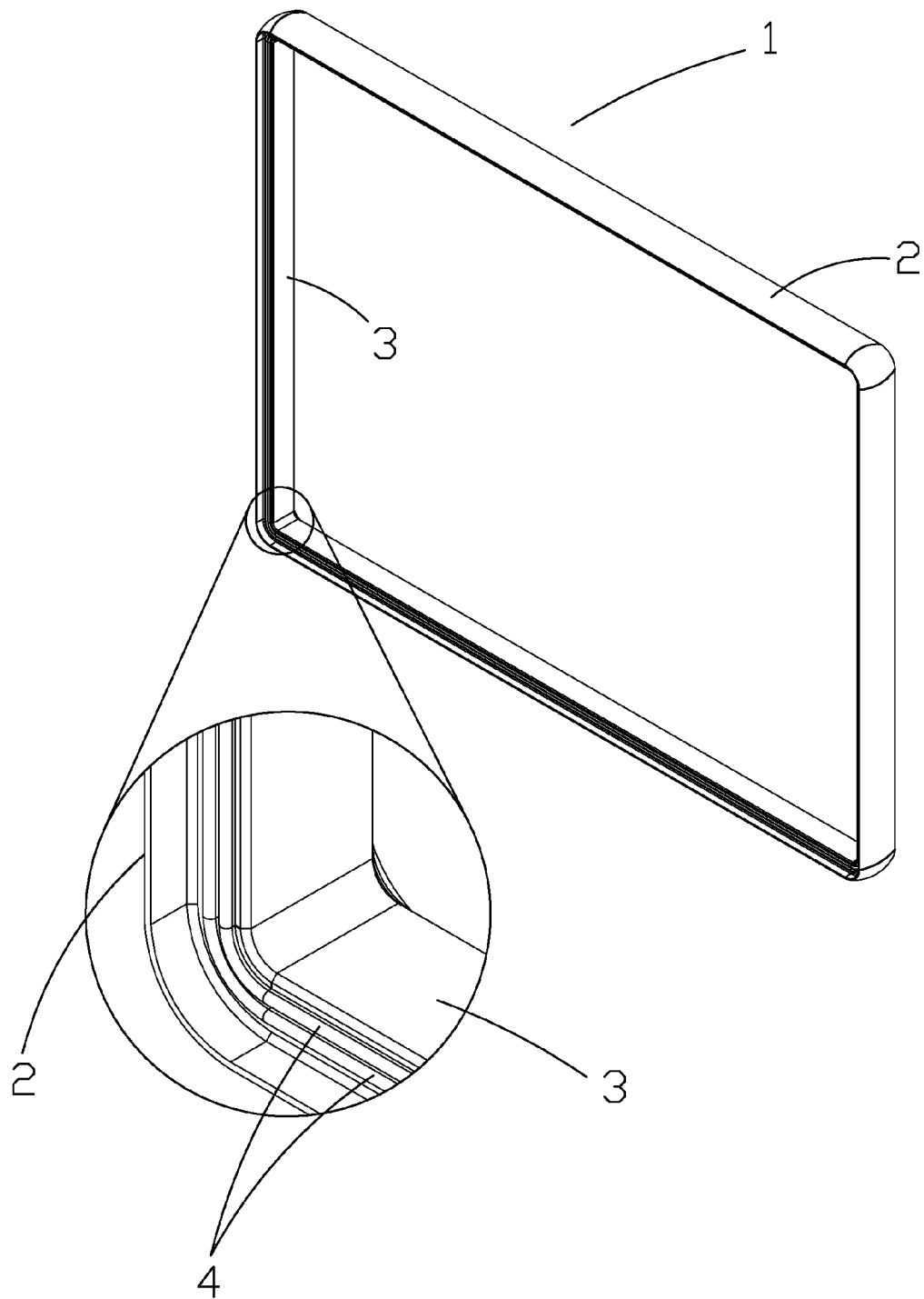
FIG. 1 is a perspective view of a preferred embodiment of water-repellent arrangement according to the invention.
Figure 2:
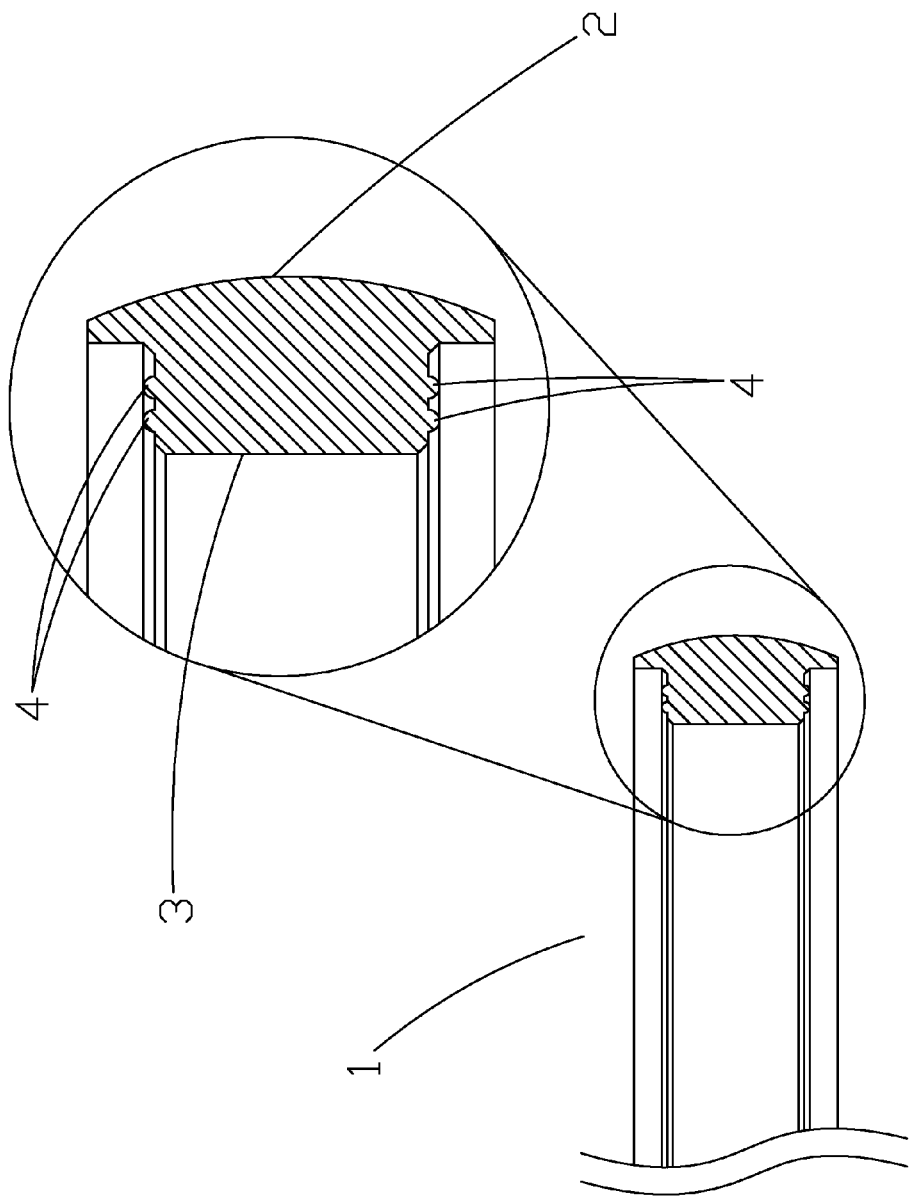
FIG. 2 is a sectional view of the water-repellent arrangement.
Figure 3:
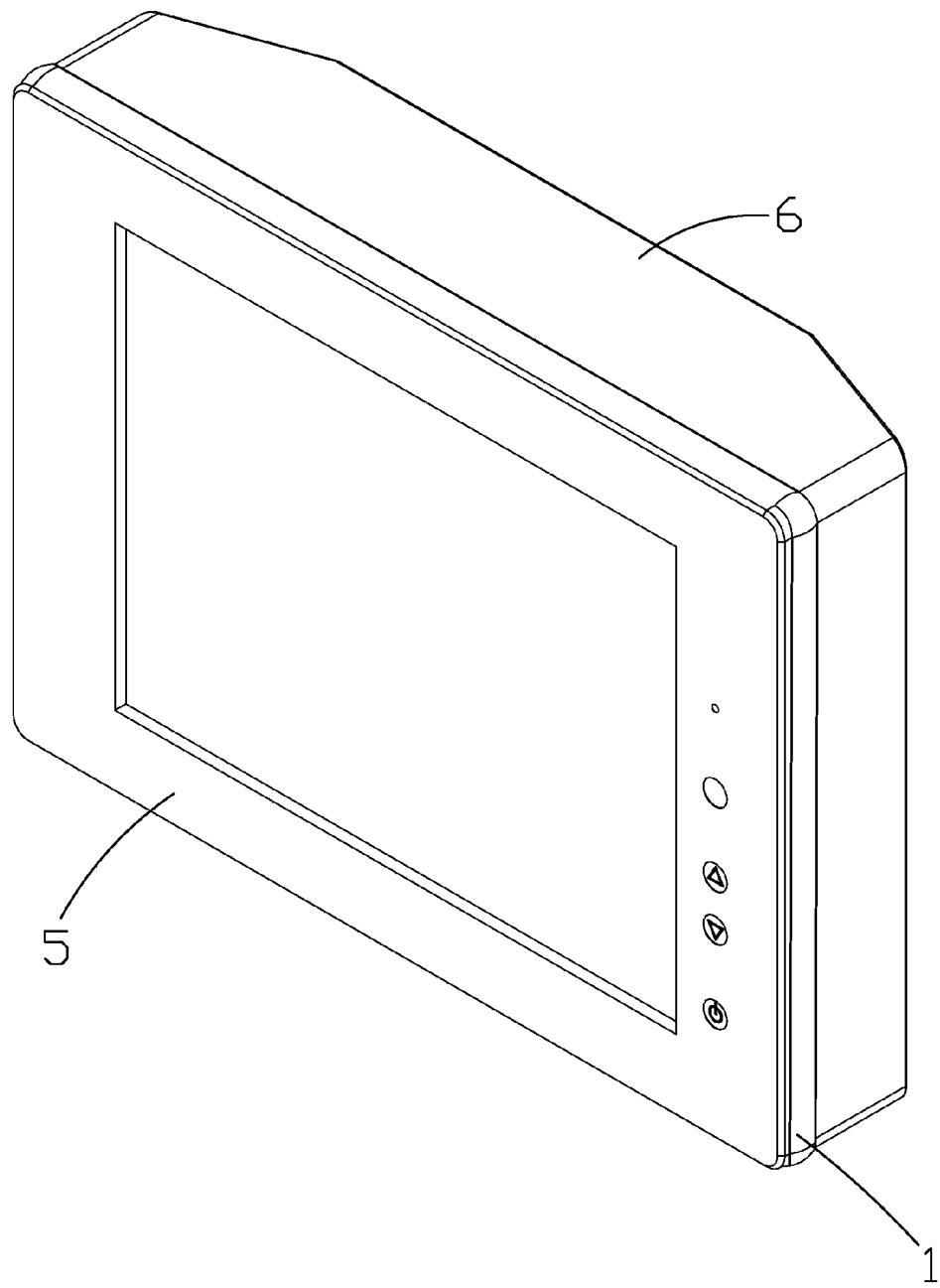
FIG. 3 is a perspective view of the water-repellent arrangement sealingly mounted around an LCD display of an industrial computer.
Figure 4:
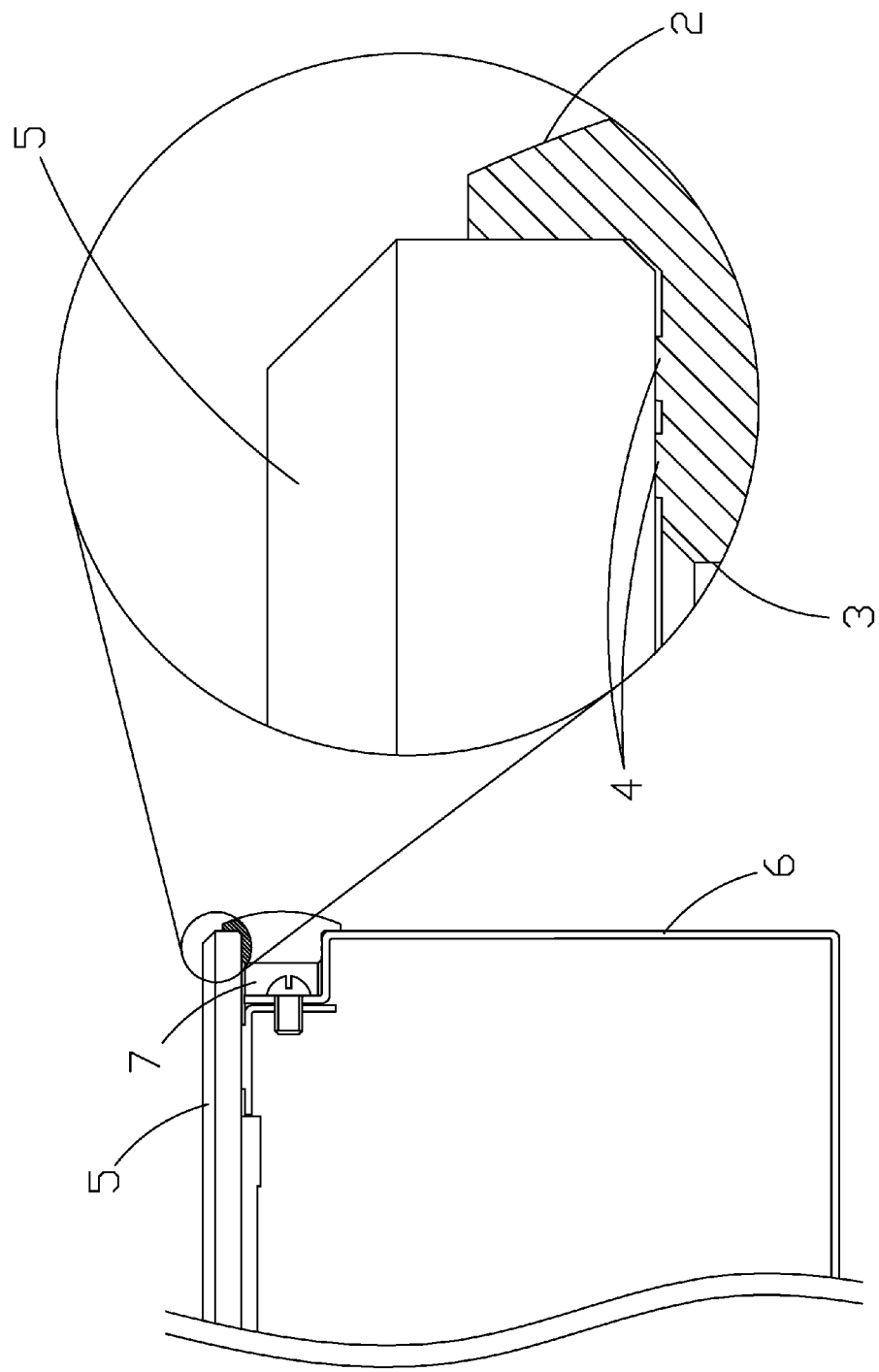
FIG. 4 is a sectional view of FIG. 3.

Referring to FIGS. 1 to 4, a water-repellent arrangement 1 in accordance with a preferred embodiment of the invention is shown. The water-repellent arrangement 1 is a hollow, rectangular member and is formed of rubber. An inner section of the water-repellent arrangement 1 is formed as an engaging section 3. An outer section 2 of the water-repellent arrangement 1 extends toward each of rear and front ends a predetermined distance and has an arcuate cross-section.

Two parallel closed projections 4 project from each of front and rear ends of the engaging section 3. Also, the closed projection 4 has an arcuate cross-section. A peripheral groove 7 is formed between an LCD display 5 and a housing 6 of an industrial computer which is secured to the LCD display 5. Either side wall of the groove 7 is formed with peripheral troughs (not numbered) (see FIG. 4). The closed projections 4 matingly fill the troughs with the LCD display 5 being tightly engaged with both the engaging section 3 and the outer section 2 and the housing 6 of the industrial computer being tightly engaged with both the engaging section 3 and the outer section 2. As a result, a water-repellent industrial computer is obtained.

The arcuate outer section 2 has the advantages of being aesthetic and being adapted to effectively absorb shocks in case of collision.

While the invention herein disclosed has been described by means of specific embodiments, numerous modifications and variations could be made thereto by those skilled in the art without departing from the scope and spirit of the invention set forth in the claims.

What is claimed is:

1. An LCD display mounted to a housing, comprising:
  a peripheral groove formed between the LCD display and the housing, the peripheral groove having a plurality of peripheral parallel mating members on either side wall;
  a resilient, hollow, rectangular water-repellant structure comprising:
  an outer member; and
  an inner member having a rectangular cross-section with a first shoulder formed between a front end thereof and the outer member, and a second shoulder formed between a rear end thereof and the outer member, the inner member comprising a plurality of peripheral parallel corresponding mating members on each of front and rear ends thereof,
  wherein the corresponding mating members are securely engaged with the peripheral parallel mating members, the LCD display being securely engaged with the front end of the inner member and the outer member, and the housing being securely engaged with the rear end of the inner member and the outer member.

* * * * *